(12) United States Patent
Hoffman et al.

(10) Patent No.: US 7,648,187 B2
(45) Date of Patent: Jan. 19, 2010

(54) VEHICLE FLOOR COVERING SYSTEM

(75) Inventors: Matthew A. Hoffman, Fort Wayne, IN (US); Robert C. Kittelson, Fort Wayne, IN (US); Robert L. Hug, Bellevue, MI (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 487 days.

(21) Appl. No.: 11/460,275

(22) Filed: Jul. 27, 2006

(65) Prior Publication Data

US 2008/0023977 A1      Jan. 31, 2008

(51) Int. Cl.
    *B62D 27/00*   (2006.01)
(52) U.S. Cl. .................... 296/97.23; 52/578
(58) Field of Classification Search .............. 296/24.3, 296/193.07, 29; 52/592.1, 591.4, 536, 537, 52/177, 578; 428/60, 57, 58, 99
    See application file for complete search history.

(56) References Cited

U.S. PATENT DOCUMENTS

| | | | | |
|---|---|---|---|---|
| 4,287,693 | A * | 9/1981 | Collette | 52/177 |
| 4,741,065 | A * | 5/1988 | Parkins | 15/217 |
| 6,318,783 | B1 * | 11/2001 | Knox | 296/39.1 |
| 6,505,444 | B1 * | 1/2003 | Johnson | 52/177 |
| 6,588,167 | B2 | 7/2003 | Chang | |
| 6,751,912 | B2 | 6/2004 | Stegner et al. | |
| 7,182,382 | B2 * | 2/2007 | Harima et al. | 296/37.2 |
| 2001/0000233 | A1 * | 4/2001 | Bailey et al. | 428/99 |
| 2002/0187300 | A1 * | 12/2002 | Nakasuji et al. | 428/95 |
| 2005/0247000 | A1 * | 11/2005 | Zhu | 52/588.1 |

* cited by examiner

*Primary Examiner*—Patricia L Engle
*Assistant Examiner*—Sunsurraye Westbrook
(74) *Attorney, Agent, or Firm*—Jeffrey P. Calfa; Mark C. Bach

(57) ABSTRACT

A mobile vehicle has an interior occupant compartment, commonly called a cab when the vehicle is a truck, that has a floor (60) covered by respective floor coverings (12, 14) that have top surfaces opposite the floor. The coverings connect to each other along a joint (16) cooperatively defined by respective over- and under-lapping margins (42, 44) of the respective coverings. One of the margins (44) has two open receptacles (50, 52), and the other (42) has formations (46, 48) each fitted respectively in a respective open receptacle so as to locate the respective top surfaces of the coverings substantially flush with each other and in substantial mutual abutment along the joint. An expanse 42A, 44A that forms at least a portion of the respective top surface is disposed beyond and integrally formed with the respective margin. A foam pad (62, 64) underlies each expanse.

16 Claims, 3 Drawing Sheets

VEHICLE FLOOR COVERING SYSTEM

FIELD OF THE INVENTION

This invention relates to a floor covering system of a mobile vehicle, such as a large truck.

BACKGROUND OF THE INVENTION

The occupant compartments of motor vehicles, such as cars and trucks, typically have some type of floor covering that is secured in place on the floor. In cars the covering is often a carpeted fabric. In trucks, especially commercial ones, coverings other than carpeted ones are used, rubber or synthetic coverings being common examples.

In some trucks separate smaller floor coverings, rather than a single large floor covering, are used. Functional and/or appearance considerations may call for the use of one or more parts to create a joint along edges where the separate coverings meet. For example, a prior joining technique known to the inventors involves the use of an extruded metal strip that is placed over the margins of the meeting edges, closing any gap between them in the process, and securing the extrusion to the floor by separate fasteners. That results in an acceptable appearance and reduces likelihood of the joint being a trip point and/or margins of the meeting edges curling. However, thermal conductivity of the fasteners and the extrusion can cause the extrusion to feel cold in winter even when the occupant compartment is warm.

Moreover, the use of an extrusion and separate fasteners adds parts to the vehicle, requires some amount of installation time, and therefore adds to manufacturing cost. Where a floor covering itself comprises multiple separate layers, such as a rubber or synthetic mat and a separate underlying pad or the like, the pad would be laid first and then covered by the mat, adding to the installation time.

SUMMARY OF THE INVENTION

Consequently, an improvement that can reduce the number of parts, that can speed and facilitate installation, and that can provide an ostensibly neater appearance would seem to be desirable.

It is toward accomplishing those objectives that the present invention is directed.

The disclosed preferred embodiment of the invention comprises a floor covering system in an occupant compartment of a mobile vehicle where separate floor coverings are connected together without the use of a separate joining strip, such as the metal extrusion mentioned earlier, and without metal fasteners for securing the strip to the floor. Instead, the connection is made by one or more formations in a connection margin of one floor covering that interlock with a respective receptacle in a connection margin of the other floor covering. One margin overlies the other so that when connection has been made, top surfaces of the floor coverings are substantially flush with each other and in substantial mutual abutment along a straight line running from one side of the occupant compartment to the other side.

Each floor covering comprises a single piece of synthetic material, fabricated by a process such as RIM molding to have the respective receptacle or respective formation as an integral feature of the respective margin. An expanse of each floor covering beyond the respective margin can be relatively thinner than its connecting margin, with underlying backing provided beyond the margin by molding a resilient foam layer to the underside of the respective thinner expanse. The synthetic material of the underlying margin can be formed to create what may be called a "milk crate pattern" that is toward the floor. That margin has a thickness providing desired support for allowing the connection of the other margin to be made by forcing that other margin downward to lodge each formation in a respective receptacle and to locate respective top surfaces of the coverings substantially flush with each other and in substantial mutual abutment along a joint formed by the margins. The "milk crate pattern" is interspersed with recesses that allow the underlying margin to locate to raised formations in the floor. The connection of the margins is made without separate fasteners and without a need to cover the joint with an additional part such as the extrusion mentioned earlier.

Accordingly, one generic aspect of the invention relates to a mobile vehicle comprising an interior occupant compartment comprising a floor having respective zones covered by respective floor coverings that have top surfaces opposite the floor. The coverings connect to each other along a joint cooperatively defined by respective over- and under-lapping margins of the respective coverings. One of the margins comprises one or more open receptacles, and the other of the margins comprises one or more formations each fitted respectively in a respective open receptacle so as to locate the respective top surfaces of the coverings substantially flush with each other and in substantial mutual abutment along the joint.

Another generic aspect of the invention relates to a floor covering system for covering the floor of an occupant compartment of a mobile vehicle comprising two floor coverings that have top surfaces and that connect to each other at respective over- and under-lapping margins. One of the margins comprises one or more receptacles, and the other of the margins comprises one or more formations fitted in a respective receptacle so as to interlock with the respective receptacle and to locate the respective top surfaces of the coverings substantially flush with each other and in substantial mutual abutment.

Still another generic aspect of the invention relates to a method of covering two respective zones of a floor of an occupant compartment of a mobile vehicle with respective floor coverings. The method comprises placing each floor covering in covering relation to the respective floor zone, and connecting the two coverings together along a joint cooperatively defined by respective over- and under-lapping margins of the respective coverings by forcing one or more formations of one covering into a respective receptacle of the other covering so as to mutually interlock the respective formation and receptacle and also locate respective top surfaces of the coverings substantially flush with each other and in substantial mutual abutment along the joint.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
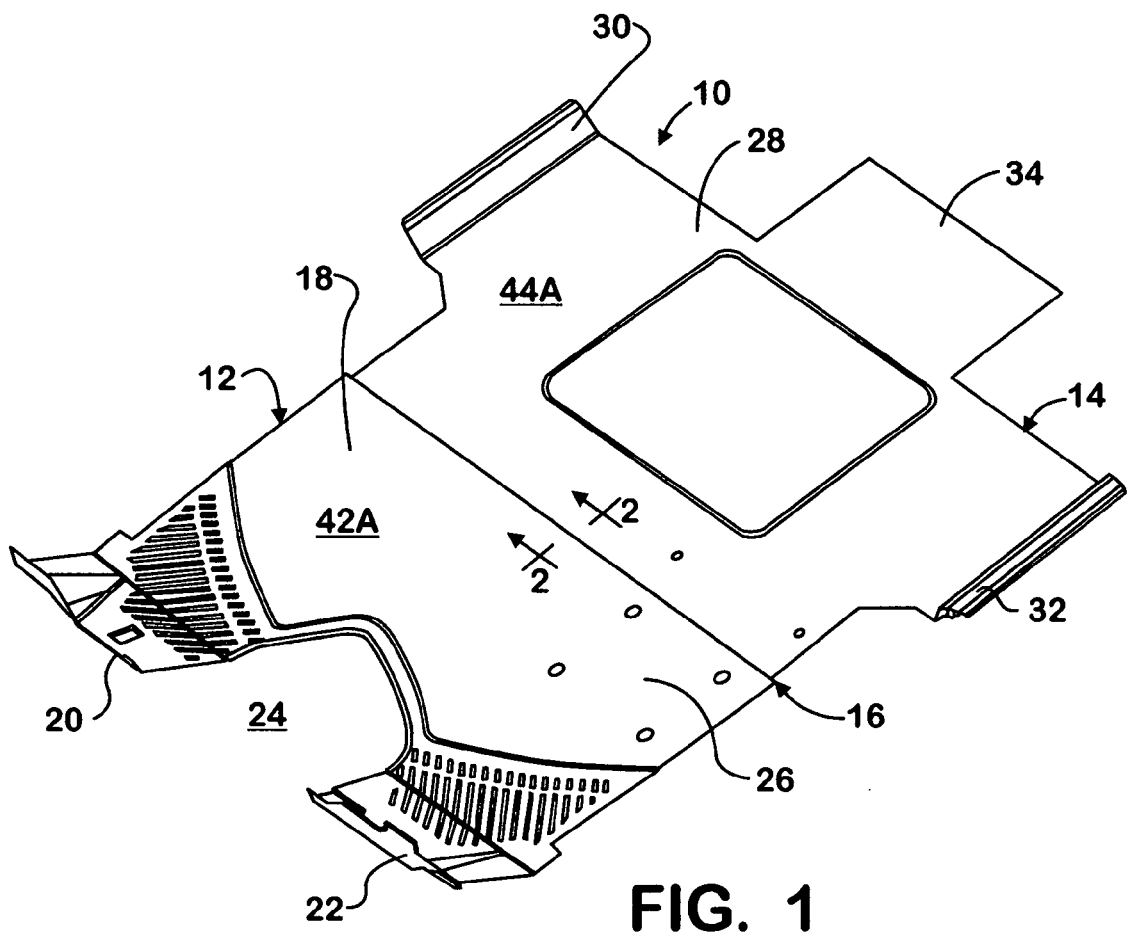
FIG. 1 is a perspective view of an exemplary floor covering system in accordance with principles of the invention.

FIG. 1 shows a floor covering system 10 comprising a front floor covering 12 and a rear floor covering 14 that are connected together along a joint 16 that runs generally perpendicular to opposite sides. Front covering 12 comprises a generally flat zone 18 having a top surface immediately contiguous and extending forwardly from joint 16. The most forward portion of covering 12 comprises right and left zones 20, 22 having the inclined shapes shown to conform to the inclined lower portion of a dash panel (not shown in this Figure) of an occupant cab of a motor vehicle when the floor covering system is installed on the floor of the occupant compartment, leaving an open space 24 where a console/engine cover is located.

Front covering 12 covers a front zone of the occupant compartment floor where the driver and passenger seats are located. The reference numeral 26 identifies the approximate area occupied by the driver's seat although the seat itself is not shown and is installed after the covering has been placed on the floor.

Rear covering 14 covers a rear zone of the occupant compartment floor behind the driver and passenger seats and comprises a generally flat zone 28 having a top surface immediately contiguous and extending rearward from joint 16. The particular shape shown has wings 30, 32 at right and left sides and a tail 34 forming the most rearward portion of covering 14.

FIGS. 2-5 show detail of how the front and rear coverings are connected to each other along joint 16. The two coverings comprise respective over- and under-lapping margins 42, 44 with margin 42 being an integral part of one piece 12A of front covering 12, and margin 44, an integral part of one piece 14A of rear covering 14. Margin 42 comprises two downwardly extending formations 46, 48, and margin 44, two upwardly open receptacles 50, 52. Formations 46, 48 are straight and parallel, running the full width of system 10 from one side to the other.

Figure 3:
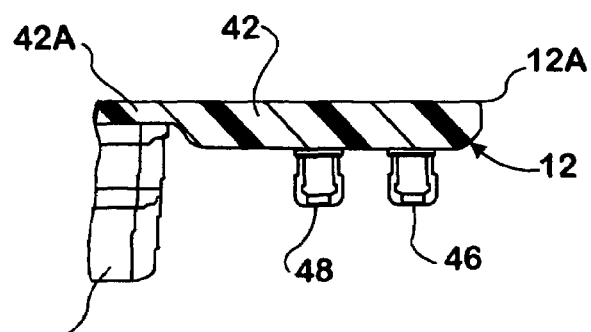
FIG. 3 is a view of one of the coverings in FIG. 2 shown by itself.

FIG. 3 shows the transverse shape of formations 46, 48, with their heights being in the vertical direction and their widths in the horizontal. The lengths of formations 44, 46 are greater than their heights and their widths, and their cross sectional shapes remain constant along their entire lengths. Hence, it can be understood that margin 42 overhangs the rear of front covering 12 and formations 44, 46 project a short distance downward from the overhang.

Figure 4:
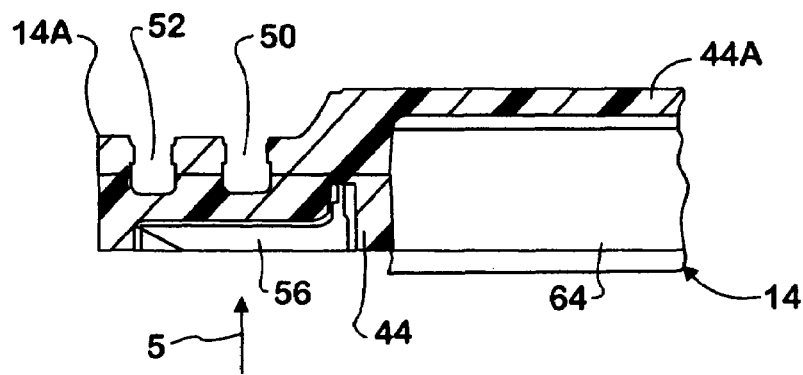
FIG. 4 is a view of the other covering in FIG. 2 shown by itself.

FIG. 4 shows the transverse shape of receptacles 50, 52, their depths being in the vertical direction and their widths in the horizontal. The lengths of receptacles 50, 52 are greater than their depths and their widths, and their cross sectional shapes remain identical along their entire lengths. Hence, it can be understood that margin 44 protrudes forwardly from the front of rear covering 14 to present receptacles 50, 52 upwardly unobstructed.

Figure 2:
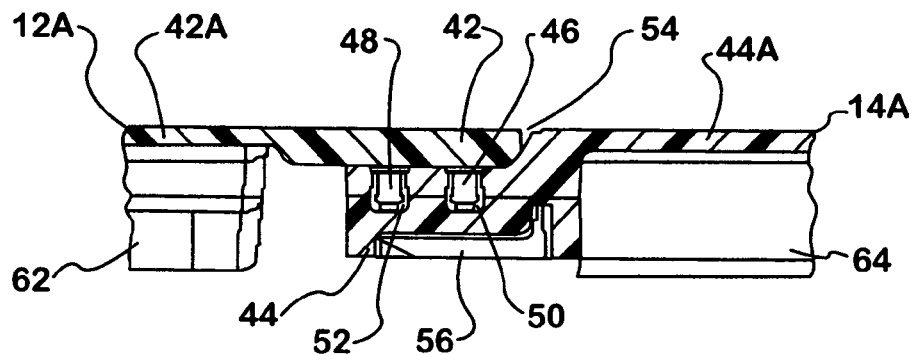
FIG. 2 is an enlarged cross section view in the direction of arrows 2-2 in FIG. 1 showing a joint connecting two floor coverings to each other.
Figure 6:
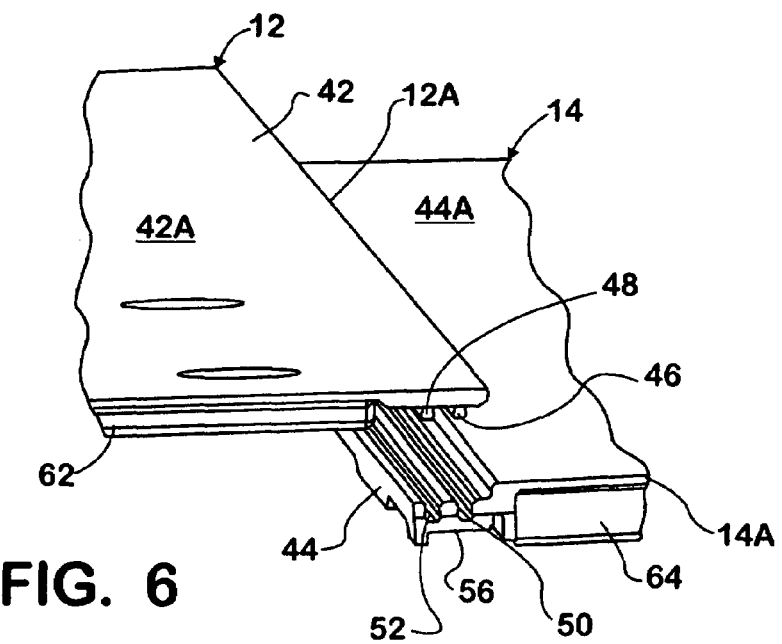
FIG. 6 is a perspective view of the parts of FIGS. 4 and 5 preparatory to being connected to each other.

Pieces 12A, 14A comprise material that is somewhat resiliently deformable to allow formations 46, 48 to be force-fit respectively to receptacles 50, 52 as suggested by first viewing FIG. 6 showing margins 42, 44 preparatory to connection and then FIG. 2 showing them connected. To make the connection, the free ends of formations 46, 48 are placed on the entrances of receptacles 50, 52, and margin 42 is pushed downward to force the formations into the receptacles. The receptacles and the formations, as viewed in transverse cross section, have negative draft, approximately 10°, provided by giving them generally trapezoidal shapes. Hence, the fit of the formations to the receptacles is like a tongue and groove connection where the tongue and groove have shapes corresponding to a dovetail and a tenon.

When the connection is complete, the receptacles and formations assume mutually interlocking relation, and the respective top surfaces of the pieces 12A, 14A are substantially flush with each other and in substantial mutual abutment along joint 16, thereby presenting an attractive appearance that is free of a separate strip and separate fasteners. Typically there is at most a crack 54 that is virtually unnoticeable.

In order to endow the pieces 12A, 14A with slight resilient deformability that enables the interlocking connection to be made, while providing integral underlying support from the "milk crate pattern", the pieces 12A, 14A are fabricated by RIM molding using a synthetic material such as polyurethane. This allows each margin 42, 44 and an adjoining thinner expanse 42A, 44A beyond each margin to be a single piece of material with integral connecting features. The top surface of cover 12 is formed by the thinner expanse 42A and the top surface of margin 42. The top surface of cover 14 is formed by the thinner expanse 44A beyond margin 44.

Figure 5:
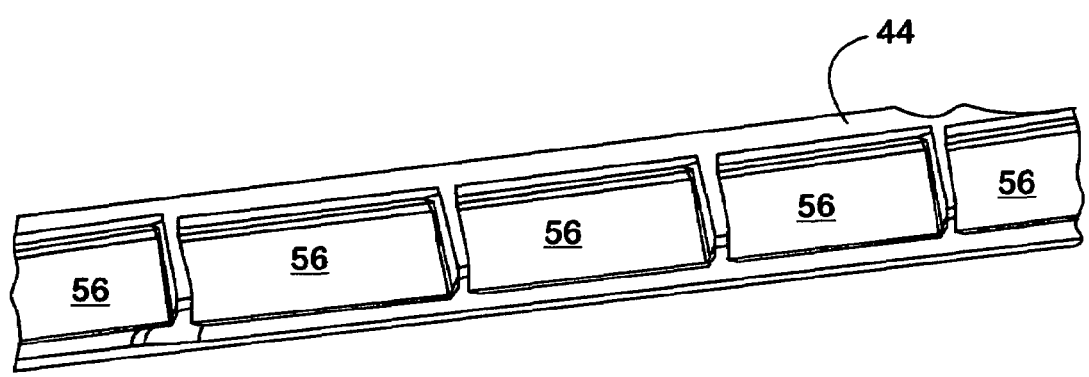
FIG. 5 is a perspective view in the general direction of arrow 5 in FIG. 4.
Figure 7:
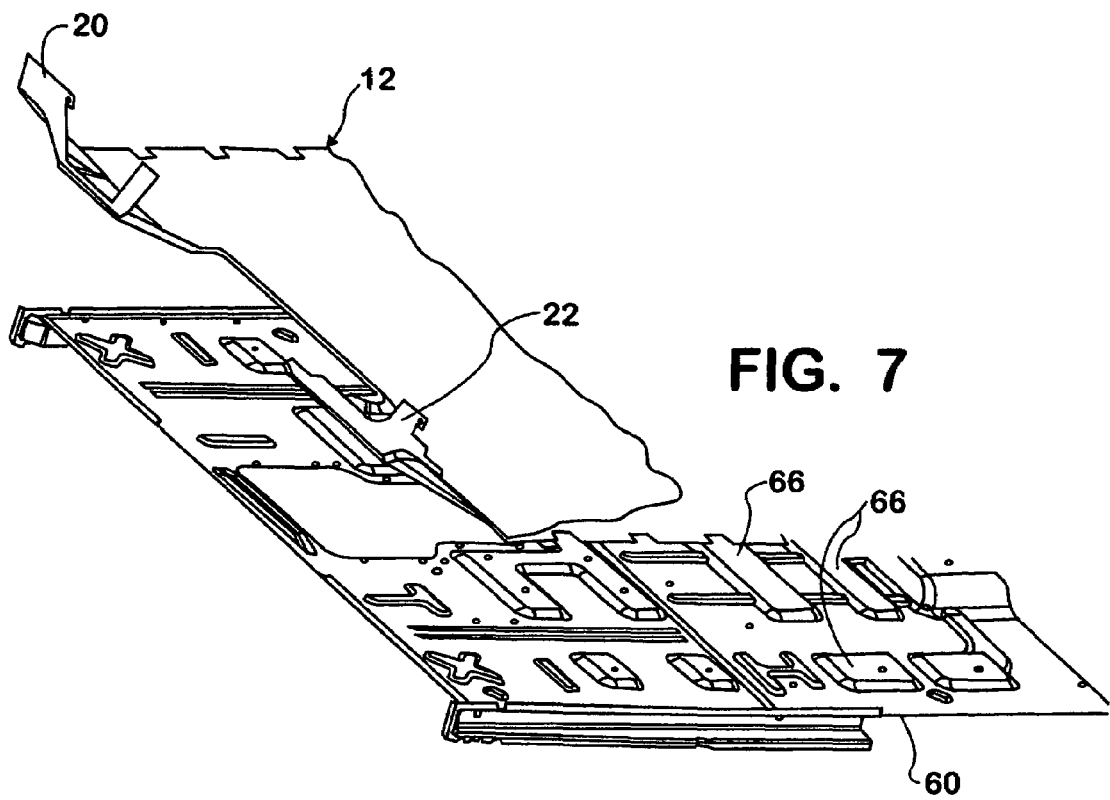
FIG. 7 is a fragmentary exploded perspective view of a portion of the floor covering system and underlying occupant compartment floor.

FIG. 5 shows the "milk crate pattern" of spaced apart recesses 56 in the lower surface of margin 44. The use of RIM-molded polyurethane creates a wall structure for the milk crate that both locates the margin properly to the underlying occupant compartment floor 60 shown in FIG. 7.

Each floor covering 12, 14 comprises a respective pad 62, 64 underlying its respective thinner expanse 42A, 44A. The pads comprise foam that is molded, or attached in a suitable way, directly to the underside of the respective thinner expanse 42A, 44A to provide a cushion layer underlying a relatively thinner, and relatively harder top layer of polyurethane. Each foam-molded pad can have its own "milk-crate-like" shape for properly locating to the occupant compartment floor by fitting recesses of recesses to raised formations, such as 66, in floor 60.

While a presently preferred embodiment of the invention has been illustrated and described, it should be appreciated that principles of the invention apply to all embodiments falling within the scope of the following claims.

What is claimed is:

1. A mobile vehicle comprising an interior occupant compartment comprising a floor having respective zones covered by respective synthetic floor coverings that have top surfaces opposite the floor and that connect to each other along a joint cooperatively defined by respective over- and under-lapping margins of the respective synthetic floor coverings, one of the respective over- and under-lapping margins comprising open receptacles, and the other of the respective over- and under-lapping margins comprising one or more formations each fitted respectively in a respective open receptacle so as to locate the top surfaces of the respective synthetic floor coverings flush with each other and in mutual abutment along the joint, wherein each of the respective synthetic floor coverings comprises a respective expanse disposed beyond, and having vertical thickness less than vertical thickness of, the respective over- and under-lapping margins and forming at least some of the top surfaces, and further including a respective foam pad disposed on and underlying at least one respective expanse, the respective foam pad having respective thickness vertically overlapping thickness of at least one of the respective over- and under-lapping margins.

2. A vehicle as set forth in claim 1 wherein each of the open receptacles and each of the one or more formations have lengths that are greater than vertical and horizontal dimensions of their transverse cross sections and that are parallel with a straight line along which the top surfaces are flush with each other and in mutual abutment.

3. A vehicle as set forth in claim 2 wherein the open receptacles and each of the one or more formations have lengths extending continuously from one side edge of the respective synthetic floor coverings to an opposite side edge of the respective synthetic floor coverings.

4. A vehicle as set forth in claim 2 wherein the open receptacles and each of the one or more formations, as viewed lengthwise, have negative draft and comprise material that is somewhat resiliently deformable allowing the open receptacles and each of the one or more formations to be force-fit together and to come into mutually interlocking relation.

5. A vehicle as set forth in claim 4 wherein the open receptacles and each of the one or more formations have trapezoidal shapes that as viewed lengthwise provide the negative draft.

6. A vehicle as set forth in claim 1 wherein the respective zones comprise a front zone containing a driver's seat and a rear zone rearward of the front zone.

7. A vehicle as set forth in claim 1 wherein each of the respective synthetic floor coverings is somewhat resiliently deformable, and the open receptacles and at least one of the one or more formations are respectively formed integrally with the respective over- and under-lapping margins to also be somewhat resiliently deformable.

8. A vehicle as set forth in claim 7 wherein the respective synthetic floor coverings comprise polyurethane.

9. A vehicle as set forth in claim 1 wherein the respective over- and under-lapping margins comprise one or more of the open receptacles disposed in a surface of the respective over- and under-lapping margins opposite the floor and multiple recesses spaced apart lengthwise of the joint in a surface of the joint toward the floor.

10. A vehicle as set forth in claim 9 wherein at least one of the respective over- and under-lapping margins comprise two of the open receptacles, each parallel with the other and extending lengthwise continuously from one side edge of the respective synthetic floor coverings to an opposite side edge of the respective synthetic floor coverings, and the top surfaces are flush with each other and in mutual abutment along a straight line that is horizontally beyond both of the two of the open receptacles.

11. A mobile vehicle comprising an interior occupant compartment comprising a floor having respective zones covered by respective synthetic floor coverings that are somewhat resiliently deformable, that have top surfaces opposite the floor, and that connect to each other along a joint cooperatively defined by respective over- and under-lapping margins of the respective synthetic floor coverings, one of the respective over- and under-lapping margins comprising integral, vertically open receptacles, and another of the respective over- and under-lapping margins comprising one or more integral vertical formations each fitted respectively in one of the integral, vertically open receptacles so as to locate the top surfaces of the respective synthetic floor coverings flush with each other and in mutual abutment along the joint, wherein each of the respective synthetic floor coverings comprises a respective expanse disposed beyond, and having a thickness less than thickness of, the respective over- and under-lapping margins and forming at least some of the top surfaces, wherein at least one of the respective over- and under-lapping margins comprise multiple recesses spaced apart along the length of the joint in a surface of the joint toward the floor so as to be vertically downwardly open and directly vertically underlying a formation fitted in at least one of the integral, vertically open receptacles.

12. A vehicle as set forth in claim 11 in which the integral, vertically open receptacles are disposed in at least one of the respective over- and under-lapping margins.

13. A vehicle as set forth in claim 11 further including respective foam pads disposed on and underlying the respective expanse, each of the respective foam pads having thickness that vertically overlaps at least one of the respective over- and under-lapping margins.

14. A vehicle as set forth in claim 12 wherein at least one of the respective over- and under-lapping margins comprises two of the integral, vertically open receptacles, each parallel with another and extending lengthwise continuously from one side edge of the respective synthetic floor coverings to an opposite side edge of the respective synthetic floor coverings, and the top surfaces are flush with each other and in mutual abutment along a straight line that is horizontally beyond both of the two of the integral, vertically open receptacles.

15. A vehicle as set forth in claim 11 wherein the integral, vertically open receptacles and the one or more integral vertical formations, as viewed lengthwise of the joint, have negative draft that in conjunction with somewhat resilient deformability allowing the integral, vertically open receptacles and each of the one or more integral vertical formations to be force-fit together and to come into mutually interlocking relation.

16. A vehicle as set forth in claim 15 wherein the integral, vertically open receptacles and the one or more integral vertical formations have trapezoidal shapes that as viewed lengthwise of the joint provide the negative draft.

\* \* \* \* \*